(12) United States Patent
Egizi

(10) Patent No.: US 6,205,983 B1
(45) Date of Patent: Mar. 27, 2001

(54) AIR ASSIST FUEL INJECTOR WITH FUEL SWIRL FEATURE

(75) Inventor: Lisa Johnenne Egizi, Portsmouth, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/229,551

(22) Filed: Jan. 13, 1999

(51) Int. Cl.[7] .................................................. F02M 23/00
(52) U.S. Cl. ..................... 123/531; 123/585; 239/403; 239/533.14
(58) Field of Search .................... 123/531, 585; 239/403, 533.12, 533.14

(56) References Cited

U.S. PATENT DOCUMENTS

| | | | |
|---|---|---|---|
| 4,434,766 | * | 3/1984 | Matsuoka et al. ................. 123/531 |
| 4,945,877 | * | 8/1990 | Ziegler et al. ..................... 123/531 |
| 5,288,025 | * | 2/1994 | Cerny ............................... 239/533.12 |
| 5,360,166 | * | 11/1994 | Nogi et al. ....................... 239/533.12 |
| 5,570,841 | * | 11/1996 | Pace et al. ....................... 239/533.12 |
| 5,951,882 | * | 9/1999 | Simmons et al. ............... 239/533.12 |

FOREIGN PATENT DOCUMENTS

| | | |
|---|---|---|
| 827139 | 1/1952 | (DE). |
| 4426198A1 | 7/1994 | (DE). |
| 19740026A1 | 8/1998 | (DE). |
| 0790404A1 | 8/1997 | (EP). |
| 2097470A | 3/1982 | (GB). |

* cited by examiner

*Primary Examiner*—Erick Solis

(57) ABSTRACT

A fuel injector for a spark-ignition, internal combustion engine includes a fuel injector body having inlet and discharge ends. The discharge end includes a fuel swirl disk for inwardly directing a plurality of fuel streams to provide a turbulent swirling stream of fuel directed axially outwardly. A valve regulates the outward axial flow of the turbulent swirling fuel stream. A mixing chamber having an air supply provides a flow of assist air and a discharge passageway. The mixing chamber receives the turbulent swirling fuel stream which is atomized as it enters the mixing chamber and the atomized fuel mixed with the assist air is directed outwardly through a discharge passageway.

16 Claims, 2 Drawing Sheets

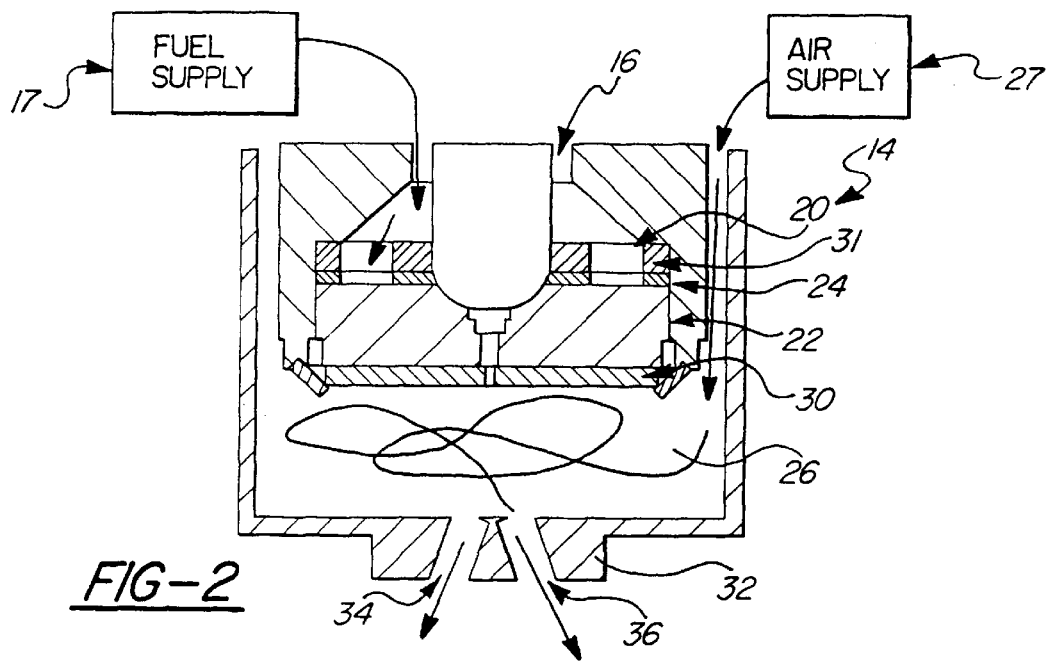
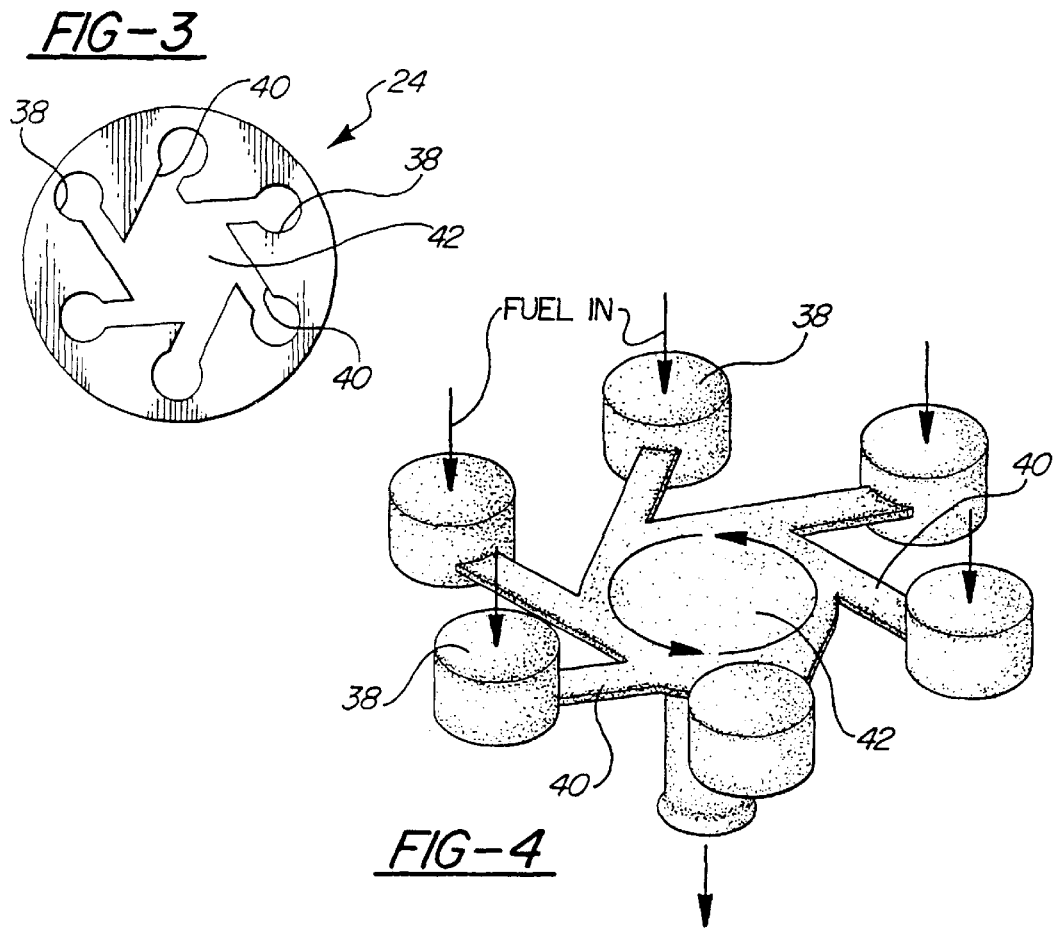

AIR ASSIST FUEL INJECTOR WITH FUEL SWIRL FEATURE

FIELD OF THE INVENTION

This invention relates to fuel injectors for spark-ignition, internal combustion engines and, more particularly, to an air assist fuel injector in which a turbulent swirling fuel stream is created and atomized, and which provides a well defined targeted spray of an air-fuel mixture.

BACKGROUND OF THE INVENTION

The advent of internal combustion engines having multiple intake valves combined with government regulations for ultra-low emission vehicles has developed a need for highly defined spray targeting of very small fuel particles.

Air assist fuel injectors have been developed that provide enhanced atomization so that exhaust emissions can be minimized through more complete combustion. Such injectors also provide a well-defined spray pattern for targeting engine intake valves.

Although these air assist injectors improve fuel atomization and fuel spray targeting, the need for improved fuel injectors providing improved fuel atomization and spray targeting continues to exist.

SUMMARY OF THE INVENTION

The present invention provides an air assist fuel injector that directs a plurality of fuel streams inwardly toward a swirl chamber where the fuel streams converge and form a turbulent swirling fuel stream directed axially outwardly past the needle valve of the injector. The swirling fuel stream readily atomizes and is carried by assist air providing a mixture having a very small particle size that is distributed as a well defined targeted spray.

The invention provides a fuel injector for a spark-ignition, internal combustion engine including a fuel injector body having inlet and discharge ends. The discharge end includes a fuel swirl disk for inwardly directing a plurality of fuel streams to provide a turbulent swirling stream of fuel directed axially outwardly. A valve element regulates the outward axial flow of the turbulent swirling fuel stream.

A mixing chamber having an air supply provides a flow of assist air and a discharge passageway. The mixing chamber receives the turbulent swirling fuel stream which is atomized as it enters the mixing chamber and the atomized fuel mixed with the assist air is directed outwardly through the discharge passageway.

According to the invention, the swirl disk includes a plurality of annularly spaced fuel inlet passages connected by fuel flow passageways to a centrally located swirl chamber. The plurality of fuel flow passageways extend from the inlet passages and tangentially connect with the centrally located swirl chamber. Fuel flowing inward through the flow passageways is swirled in the centrally located swirl chamber and then discharged axially.

In one embodiment of the invention, the fuel swirl disk includes six radially spaced fuel inlet passages and six fuel flow passageways.

The mixing chamber air supply provides an inwardly directed flow of assist air which carries the atomized fuel stream outwardly through the discharge passageway. An orifice plate may be interposed between the swirl disk and mixing chamber for throttling the turbulent swirling fuel stream into the mixing chamber, thereby improving fuel atomization provided by the pressure drop across the orifice.

In an exemplary embodiment, an air shroud encloses the mixing chamber. Axially disposed spray shaping passages are in communication with the mixing chamber discharge passageway for providing an atomized fuel spray distribution through the passages.

In an application where the injector is used with an internal combustion engine having cylinders with two intake valves, the shroud includes two spray shaping passages for providing a targeted split stream spray pattern therein.

These and other features and advantages of the invention will be more fully understood from the following detailed description of the invention taken together with the accompanying drawings.

BRIEF DESCRIPTION OF THE DRAWINGS

The accompanying drawings, which are incorporated herein and constitute part of this specification, illustrate presently preferred embodimentsof the invention, and, together with a general description given above and the detailed description of the preferred embodiments given below, serve to explain the principles of the invention.

FIG. 2 is schematic view of the discharge end of the injector;

FIG. 3 is an enlarged plan view of the fuel swirl disk; and

FIG. 4 is a schematic view illustrating fuel flow through the swirl disk.

DETAILED DESCRIPTION OF THE INVENTION

Figure 1:
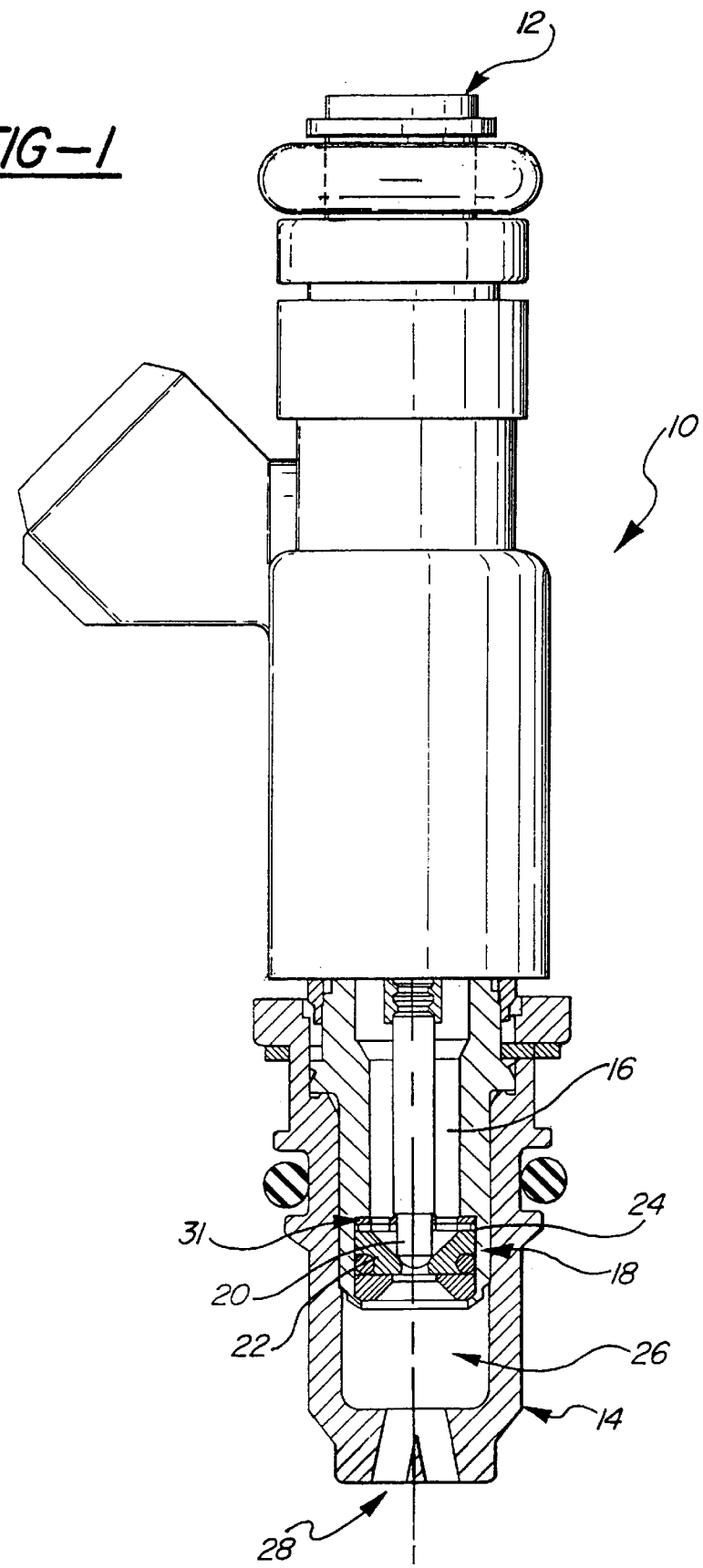
FIG. 1 is a side view of a fuel injector constructed in accordance with the present invention, illustrating in sectional view its discharge end, including a fuel swirl disk.

Referring to FIGS. 1 through 4, there is shown a fuel injector 10 for a spark-ignition internal combustion engine, not shown, used to supply an atomized fuel spray into cylinder ports (not shown) of the engine. As is hereinafter more fully described, the fuel injector 10 provides a fuel-air mixture having a very small particle size that is well defined.

As illustrated in FIG. 1, the fuel injector 10 includes inlet and discharge ends 12, 14. A fluid passage 16 conducts fuel from fuel supply 17 through the inlet end 12 to the discharge end 14. A valve 18 comprised of a plunger or needle 20 and corresponding seat 22 controls the flow of fuel through the injector 10 through actuation by conventional means.

A fuel swirl disk 24 is disposed upstream adjacent seat 22. Swirl disk 24 receives fuel from passage 16 and directs a plurality of fuel streams inwardly, creating a turbulent swirling stream of fuel in the center of the disk which is then directed axially outwardly when needle 20 is unseated.

A mixing chamber 26 having a discharge passageway 28 receives the turbulent swirling fuel stream passing through seat 22. The turbulent swirling fuel stream is atomized as it enters mixing chamber 26.

Mixing chamber 26 is also provided with a flow of assist air received from air supply 27 which mixes with and carries the atomized fuel, as a resulting mixture with the assist air, outwardly through discharge passageway 28.

As illustrated in the exemplary embodiment of FIG. 2, the discharge end 14 of injector 10 may include an orifice plate 30 interposed between swirl disk 24 and mixing chamber 26 for throttling the turbulent swirling fuel stream passing into the mixing chamber and enhancing the atomization of the fuel. A lower guide 31 disposed upstream and adjacent the swirl disk 24 guides the needle and facilitates the transition of the fuel flow from passage 16 into swirl disk 24.

With reference to FIG. 2, the discharge end 14 includes an air shroud 32 having two spray shaping passages 34, 36 that provide a targeted split stream spray pattern for use in an engine having two intake valves per cylinder.

FIGS. 3 and 4 illustrate, in detail, swirl disk 24 and its effect on fuel flow. Swirl disk 24 includes a plurality of annularly spaced fuel inlet passages 38 that receive fuel from fuel passage 16. Swirl disk 24 also includes a like plurality of flow passageways 40 and a centrally located swirl chamber 42. Flow passageways 40 extend from the inlet passages 38 and tangentially connect with the centrally located swirl chamber 42.

When needle 20 is unseated, fuel is allowed to flow through the injector 10. The fuel flowing axially through fuel passage 16 enters the inlet passages 38 in the swirl disk 24 and is turned inwardly. The tangential interface of the flow passageways 40 and swirl chamber 42 cause the inwardly flowing fuel to swirl and become turbulent, as illustrated in FIG. 4.

Turbulent swirling fuel is directed axially outwardly of the disk 24 and through seat 22. Upon entering the mixing chamber 26, the turbulent swirling fuel is atomized into very small particles. The small particles are carried by and mixed with the assist air and spray shaped into a well defined split stream spray pattern.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A fuel injector for a spark-ignition, internal combustion engine comprising:

a fuel injector body including inlet and discharge ends;

said discharge end including a fuel swirl disk for inwardly directing a plurality of fuel streams to provide a turbulent swirling stream of fuel directed axially outwardly;

a needle guide disposed adjacent the swirl disk;

a valve for regulating the outward axial flow of the turbulent swirling fuel stream; and a mixing chamber having an air supply for providing a flow of assist air and a discharge passageway;

said mixing chamber receiving said turbulent swirling fuel stream wherein the fuel is atomized and mixed with the assist air and the resulting mixture is directed outwardly through said discharge passageway.

2. The fuel injector of claim 1 wherein said fuel swirl disk includes:

a plurality of annularly spaced fuel inlet passages;

a like plurality of fuel flow passageways; and a centrally located swirl chamber;

said fuel flow passageways extending from said inlet passages and tangentially connecting with said centrally located swirl chamber.

3. The fuel injector of claim 2 wherein said fuel swirl disk includes six radially spaced fuel inlet passages and six fuel flow passageways.

4. The fuel injector of claim 1 wherein said mixing chamber air supply provides an inwardly directed flow of assist air.

5. The fuel injector of claim 1 comprising an orifice plate interposed between said swirl disk and said mixing chamber for throttling the turbulent swirling fuel stream into said mixing chamber.

6. The fuel injector of claim 1 comprising an air shroud including a plurality of axially disposed spray shaping passages;

said air shroud enclosing said mixing chamber; and said axially disposed spray shaping passages being in communication with said mixing chamber discharge passageway for providing an atomized fuel spray distribution through the passages.

7. The fuel injector of claim 6 wherein said air shroud includes two spray shaping passages for providing a targeted split stream spray pattern.

8. A method of operating a fuel injector for delivering an air-fuel mixture in a fuel injected spark ignition internal combustion engine, the method comprising:

inwardly directing a plurality of fuel streams through a fuel swirl disk to provide a turbulent swirling stream of fuel directed axially outwardly;

regulating the axial flow of the turbulent swirling stream;

providing a supply of assist air;

atomizing the turbulent swirling stream of fuel; and mixing the atomized fuel with the assist air;

thereby providing a finely atomized air-fuel mixture.

9. The method of claim 8 wherein the step of directing a plurality of fuel streams to provide a turbulent swirling stream of fuel directed axially outwardly includes providing a fuel swirl disk in a discharge end of the fuel injector;

said swirl disk including:

a plurality of annularly spaced fuel inlet passages;

a like plurality of fuel flow passageways; and a centrally located swirl chamber;

said fuel flow passageways extending from said inlet passages and tangentially connecting with said centrally located swirl chamber.

10. An air assist fuel injection system for supplying a mixture of atomized fuel and air to an internal combustion engine comprising:

an air supply providing a flow of assist air;

a fuel supply providing a supply of fuel;

a fuel injector having inlet and discharge ends;

said discharge end including a fuel swirl disk for inwardly directing a plurality of fuel streams to provide a turbulent swirling stream of fuel directed axially outwardly;

a needle guide disposed adjacent the swirl disk;

a valve for regulating the outward axial flow of the turbulent swirling fuel stream; and a mixing chamber having an air supply for providing a flow of assist air and a discharge passageway;

said mixing chamber receiving the turbulent swirling fuel stream wherein the fuel is atomized and mixed with the assist air and the resulting mixture is directed outwardly through the discharge passageway.

11. The fuel injection system of claim 10 wherein said fuel swirl disk includes:

a plurality of annularly spaced fuel inlet passages;

a like plurality of fuel flow passageways; and a centrally located swirl chamber, said fuel flow passageways extending from said inlet passages and tangentially connecting with said centrally located swirl chamber.

12. The fuel injection system of claim 11 wherein said fuel swirl disk includes six radially spaced fuel inlet passages and six fuel flow passageways.

13. The fuel injection system of claim 10 wherein said mixing chamber air supply provides an inwardly directed flow of assist air.

14. The fuel injection system of claim 10 comprising an orifice plate interposed between said swirl disk and said mixing chamber for throttling the turbulent swirling fuel stream into said mixing chamber.

15. The fuel injection system of claim 10 comprising an air shroud including a plurality of axially disposed spray shaping passages;

said air shroud enclosing said mixing chamber; and said axially disposed spray shaping passages being in communication with said mixing chamber discharge passageway for providing an atomized fuel spray distribution through the passages.

16. The fuel injector of claim 15 wherein said air shroud includes two spray shaping passages for providing a targeted split stream spray pattern.

* * * * *